(12) United States Patent
Kim et al.

(10) Patent No.: US 9,354,647 B2
(45) Date of Patent: May 31, 2016

(54) ADJUSTABLE REFERENCE CURRENT GENERATING CIRCUIT AND METHOD FOR DRIVING THE SAME

(71) Applicant: SAMSUNG DISPLAY CO., LTD., Yongin, Gyeonggi-Do (KR)

(72) Inventors: Bo-Yeon Kim, Yongin (KR); Hee-Sun Ahn, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/444,185

(22) Filed: Jul. 28, 2014

(65) Prior Publication Data

US 2015/0042306 A1 Feb. 12, 2015

(30) Foreign Application Priority Data

Aug. 12, 2013 (KR) .................. 10-2013-0095269

(51) Int. Cl.
| | | |
|---|---|---|
| *H02M 3/158* | (2006.01) | |
| *G05F 1/56* | (2006.01) | |
| *H02M 3/156* | (2006.01) | |
| *G05F 3/26* | (2006.01) | |
| *H02M 3/155* | (2006.01) | |
| *H02M 3/137* | (2006.01) | |

(52) U.S. Cl.
CPC . *G05F 1/561* (2013.01); *G05F 3/26* (2013.01); *H02M 3/137* (2013.01); *H02M 3/156* (2013.01); *H02M 2003/1555* (2013.01)

(58) Field of Classification Search
CPC ........... G05F 1/561; G05F 1/648; G05F 3/26; H02M 3/156; H02M 3/3385; H02M 3/137; H02M 2003/1555

USPC .................. 323/297, 298, 315, 316, 354, 313
See application file for complete search history.

(56) References Cited

U.S. PATENT DOCUMENTS

| | | | |
|---|---|---|---|
| 5,889,394 A | 3/1999 | Czarnocki | |
| 8,183,914 B2 | 5/2012 | Tsai et al. | |
| 8,441,246 B2 | 5/2013 | Hong | |
| 2005/0243657 A1* | 11/2005 | Nagata | ........................ 368/204 |
| 2007/0210855 A1* | 9/2007 | Raimar | ........................ 327/538 |
| 2009/0201006 A1 | 8/2009 | Mitani et al. | |

(Continued)

FOREIGN PATENT DOCUMENTS

| | | |
|---|---|---|
| KR | 10-2009-0087830 A | 8/2009 |
| KR | 10-2010-0074420 A | 7/2010 |

(Continued)

*Primary Examiner* — Jessica Han
*Assistant Examiner* — Demetries A Gibson
(74) *Attorney, Agent, or Firm* — Lee & Morse, P.C.

(57) ABSTRACT

A current generating circuit includes a reference voltage generating unit, a clock signal generating unit, a reference current generating unit, and a current mirror unit. The reference voltage generating unit generates a first reference voltage and a second reference voltage. The clock signal generating unit generates clock signals. The reference current generating unit generates a reference current corresponding to a selection signal based on the first reference voltage. The current mirror unit supplies a first current and a second current based on the reference current. A capacitor charges voltage based on the second current. A selection signal generating unit counts clock signals during a period in which a voltage charged in the capacitor is less than the second reference voltage, and outputs the selection signal based on the counted result.

17 Claims, 3 Drawing Sheets

(56) References Cited

U.S. PATENT DOCUMENTS

2010/0141344 A1    6/2010    Kim et al.
2012/0152036 A1*    6/2012    Stein et al. ............... 73/862.626
2013/0043848 A1*    2/2013    Lin ............................. 323/234
2013/0074473 A1*    3/2013    Cosby et al. ................... 60/274

FOREIGN PATENT DOCUMENTS

KR    10-2010-0080958 A    7/2010
KR    010-2010-0116290 A    11/2010

\* cited by examiner

ADJUSTABLE REFERENCE CURRENT GENERATING CIRCUIT AND METHOD FOR DRIVING THE SAME

CROSS-REFERENCE TO RELATED APPLICATION

Korean Patent Application No. 10-2013-0095269, filed on Aug. 12, 2013, in the Korean Intellectual Property Office, and entitled, "Reference Current Generating Circuit and Method For Driving The Same," is incorporated by reference herein in its entirety.

BACKGROUND

1. Field

One or more embodiments described herein relate to generating current.

2. Description of the Related Art

Many electronic devices include a reference voltage source or reference current source for stable operation. The reference voltage or reference current may serve as a reference for various circuits in the device. Accordingly, the reference voltage or current should be maintained at a constant level under at least some circumstances.

Some reference voltage sources are insensitive to their external environments, including, for example, changes in external temperature. These voltage sources may therefore supply a relatively constant reference voltage. However, some reference current sources are more susceptible to be adversely affected by their external environments, compared with many types of reference voltage sources. It may therefore be difficult for reference current sources to supply a constant reference current under various operating and environmental conditions.

SUMMARY

In accordance with one embodiment, a reference current generating circuit including a reference voltage generating unit configured to generate a first reference voltage and a second reference voltage; a clock signal generating unit configured to generate clock signals; a reference current generating unit configured to generate a reference current corresponding to a selection signal based on the first reference voltage; a current mirror unit configured to supply a first current and a second current based on the reference current; a capacitor configured to charge based on the second current; and a selection signal generating unit configured to count the clock signals during a period in which a voltage charged in the capacitor is less than the second reference voltage, and to output the selection signal based on the counted result. The first current may be supplied as a reference current to a circuit.

The reference voltage generating unit may includes a reference voltage source configured to supply the first reference voltage, and a second reference voltage generating circuit configured to generate the second reference voltage based on the first reference voltage. The clock signal generating unit may include a crystal oscillator.

The reference current generating unit may include a first intermediate voltage generating unit configured to generate a first intermediate voltage based on the selection signal; a voltage follower configured to supply a second intermediate voltage based on the first intermediate voltage; and a first resistor coupled between an output terminal of the voltage follower and ground, the first resistor coupled to the reference current.

The first intermediate voltage generating unit may include an amplifier configured to include a first input terminal, a second input terminal, and an output terminal; second resistors coupled in series between the output terminal and ground; and a selection circuit configured to allow the second input terminal and one of nodes between respective pairs of the second resistors to be coupled to each other based on the selection signal, wherein the first input terminal receives the first reference voltage and wherein the output terminal supplies the first intermediate voltage.

The selection signal generating unit may include a comparator configured to output a comparison result signal of a first level during a period in which the voltage charged in the capacitor is less than the second reference voltage; and a controller configured to count the clock signals during a period in which the comparison result signal of the first level is supplied, and to output the selection signal based on the counted result.

The selection signal generating unit may include a first switching element configured to allow a power source and an output terminal of the comparator to be electrically coupled to each other based on a current adjustment enable signal; and a second switching element coupled between the capacitor and ground, the second switching element to be switched based on a voltage of the output terminal of the comparator.

The controller may supply the current adjustment enable signal from a time when an enable signal is supplied to a time when the comparison result signal changes from the first level to a second level.

In accordance with another embodiment, a method for driving a reference current generating circuit includes generating an intermediate voltage based on a first reference voltage; generating a reference current corresponding to the intermediate voltage; charging a capacitor based on the reference current; counting clock signals during a period in which a second reference voltage is less than a voltage charged in the capacitor; and adjusting the intermediate voltage based on the counted result.

Adjusting the intermediate voltage may include counting the clock signals generated by an oscillator during the period in which the second reference voltage is les than the voltage charged in the capacitor; generating a selection signal based on the counted result; and adjusting the intermediate voltage based on the selection signal.

In accordance with another embodiment, a current control circuit may include a comparator to compare first and second voltages; and a signal generator to generate a control signal based on the comparison, wherein the first voltage is output from a capacitor and the second voltage is a first reference voltage, wherein the first voltage is based on a current, and wherein the control signal is to adjust the current to maintain a substantially constant level.

The signal generator may generate the control signal based on clock signals. The signal generator may count the clock signals between a first time and a second time, the first time corresponding to when the capacitor stores a second reference voltage and the second time corresponding to when the first voltage equals the second voltage. The signal generator may generate the control signal based on a number of the clock signals counted between the first and second times. The number of counted clock signals may be based on a period during which the first voltage is less than the second voltage.

The first reference voltage may be a predetermined voltage, and the second reference voltage may be substantially a zero voltage. The substantially constant level of the current may be based on the first reference voltage.

The current control circuit may include a current mirror circuit to output the current, wherein the capacitor is coupled between the comparator and the current mirror circuit. The current mirror circuit includes a first signal path coupled to an output terminal and a second signal path to output the current to the capacitor.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
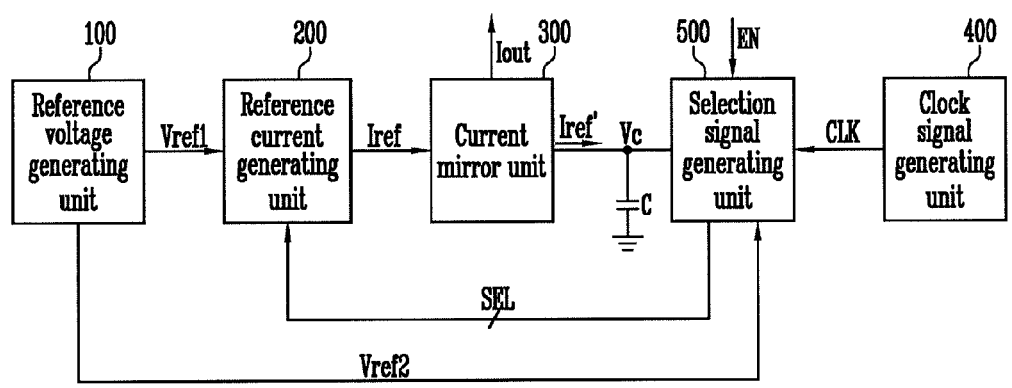
FIG. 1 illustrates an embodiment of a reference current generating circuit.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

FIG. 1 illustrates an embodiment of a reference current generating circuit 10 which includes a reference voltage generating unit 100, a reference current generating unit 200, a current mirror unit 300, a clock signal generating unit 400, a selection signal generating unit 500, and a capacitor C. The reference voltage generating unit 100 generates a first reference voltage Vref1 for input into reference current generating unit 200. The reference voltage generating unit 100 generates a second reference voltage Vref2 for input into selection signal generating unit 500.

Figure 2:
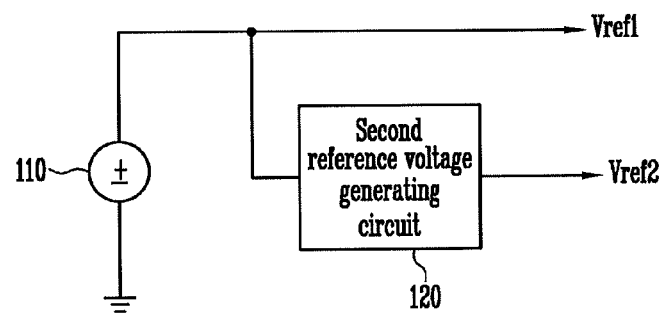
FIG. 2 illustrates an embodiment of a reference voltage generating unit.

FIG. 2 illustrates an embodiment of the reference voltage generating unit in FIG. 1. Referring to FIGS. 1 and 2, reference voltage generating unit 100 includes a reference voltage source 110 and a second reference voltage generating circuit 120.

The reference voltage source 110 is coupled between the reference current generating unit 200 and ground, and generates first reference voltage Vref1. The first reference voltage Vref1 is supplied to reference current generating unit 200 and second reference voltage generating circuit 120.

The second reference voltage generating circuit 120 generates second reference voltage Vref2 based on the first reference voltage Vref1 supplied from reference voltage source 110. The second reference voltage generating circuit 120 generates the second reference voltage Vref2, for example, by boosting (e.g., increasing) the first reference voltage Vref1 or by dropping (e.g., reducing) the first reference voltage Vref1.

The reference current generating unit 200 generates reference current Iref based on the first reference voltage Vref1 from reference voltage generating unit 100. The reference current generating unit 200 generates reference current Iref based on selection signal SEL from selection signal generating unit 500. For example, the amplitude of the reference current Iref may be determined based on selection signal SEL.

The current mirror unit 300 generates first current Iout and second current Iref based on reference current Iref from reference current generating unit 200. The first current Iout is an output current supplied to a circuit outside of reference current generating circuit 10. The second current Iref is charged in capacitor C.

Figure 3:
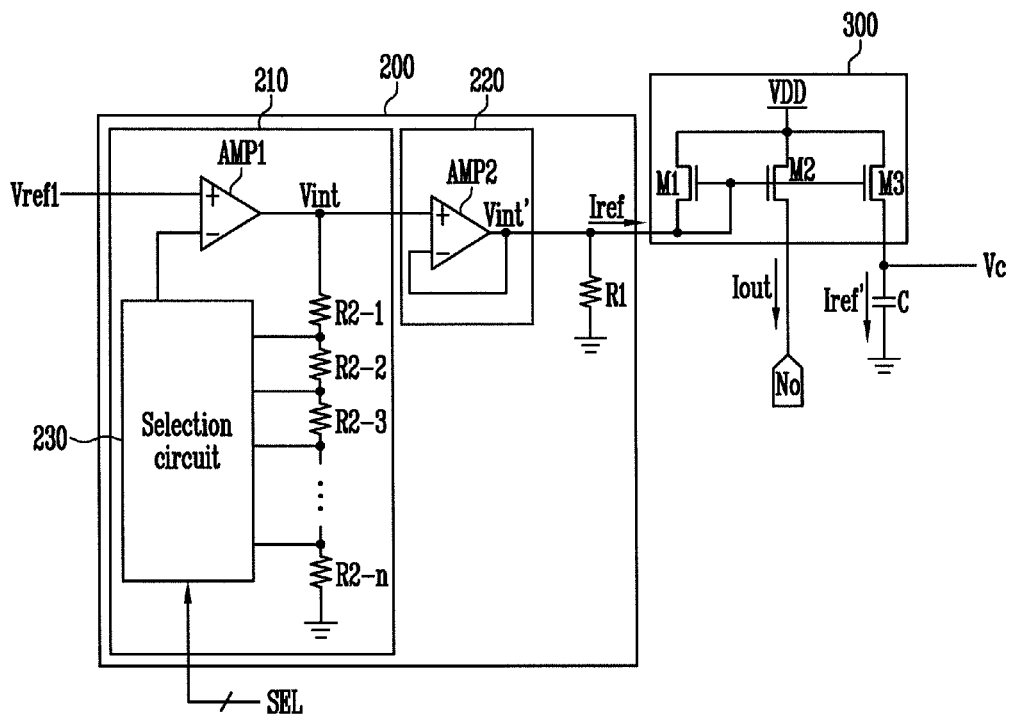
FIG. 3 illustrates a reference current generating unit and a current mirror unit.

FIG. 3 illustrates an embodiment of reference current generating unit 200 and current mirror unit 300 in FIG. 1. Referring to FIGS. 1 and 3, reference current generating unit 200 includes an intermediate voltage generating unit 210, a voltage follower 220, and a first resistor R1.

The intermediate voltage generating unit 210 generates first intermediate voltage Vint based on selection signal SEL from selection signal generating unit 500. The intermediate voltage generating unit 210 may include a non-inverting amplifier which adjusts a gain value based on selection signal SEL. For example, intermediate voltage generating unit 210 includes a first amplifier AMP1, second resistors R2-1 to R2-$n$, and a selection circuit 210.

The first amplifier AMP1 includes a first input terminal to receive first reference voltage Vref1 from reference voltage generating unit 100, a second input terminal coupled to selection circuit 230, and an output terminal to supply first intermediate voltage Vint. The second resistors R2-1 to R2-$n$ are coupled in series between an output terminal of the first amplifier AMP1 and ground.

Selection circuit 230 controls a coupling between the second input terminal of first amplifier AMP1 and one of a plurality of nodes between respective pairs of second resistors R2-1 to R2-$n$ based on selection signal SEL from selection signal generating unit 500. The gain value of intermediate voltage generating unit 210 is adjusted based on this coupling.

The voltage follower 220 supplies a second intermediate voltage Vint' to first resistor R1. The second intermediate voltage Vint' is based on the first intermediate voltage Vint from intermediate voltage generating unit 210. In this embodiment, voltage follower 220 includes a second amplifier AMP2.

The second amplifier AMP2 includes a first input terminal to receive the first intermediate voltage Vint from intermediate voltage generating unit 210 and a second input terminal coupled to an output terminal. The output terminal supplies the second intermediate voltage Vint' based on first intermediate voltage Vint.

The first resistor R1 is coupled between voltage follower 220 and ground. For example, first resistor R1 is coupled between the output terminal of the second amplifier AMP2 of voltage follower 220 and ground. The first resistor R1 generates reference current Iref based on the second intermediate voltage Vint' from voltage follower 220.

The current mirror unit 300 includes a plurality of transistors M1 to M3. The first transistor M1 is coupled between a power source VDD and reference current generating unit 200. The first transistor M1 includes a first electrode coupled to power source VDD, a second electrode coupled to reference current generating unit 200, and a gate electrode coupled to the second electrode.

In one embodiment, the first and second electrodes may correspond to source and drain electrodes. For example, the first and second electrodes may be the source and drain electrodes, respectively. On the contrary, the first and second electrodes may be the drain and source electrodes, respectively.

The second transistor M2 is coupled between power source VDD and output node No. The second transistor M2 may include a first electrode coupled to power source VDD, a second electrode coupled to output node No, and a gate electrode coupled to the gate electrode of first transistor M1. The output node No is coupled to another circuit coupled to reference current generating circuit 10.

The third transistor M3 is coupled between power source VDD and one end of capacitor C. For example, third transistor M3 may include a first electrode coupled to power source VDD, a second electrode coupled to the one end of capacitor C, and a gate electrode coupled to the gate electrode of first transistor M1.

The plurality of transistors M1 to M3 forms a current mirror circuit. The reference current Iref flowing through first transistor M1, first current Iout flowing through second transistor M2, and second current Iref' flowing through third transistor M3 may have the same amplitude. The capacitor C outputs a voltage Vc based on second current Iref'.

The clock signal generating unit 400 generates a clock signal CLK for input into selection signal generating unit 500. The clock signal generating unit 400 may be implemented as a crystal oscillator in order to generate the clock signal CLK having a period constant with respect to a change in temperature.

The selection signal generating unit 500 compares the voltage Vc charged in capacitor C with the second reference voltage Vref2 supplied to reference voltage generating unit 100. The selection signal generating unit 500 counts clock signals CLK supplied from clock signal generating unit 400 during a period in which the voltage Vc is lower than second reference voltage Vref2, based on a result of the comparison. The selection signal generating unit 500 generates a selection signal SEL based on the counted result, and supplies selection signal SEL to reference current generating unit 200.

In one embodiment, selection signal generating unit 500 compares the number of the counted clock signals CLK with a predetermined value. When the number of counted clock signals CLK is greater than the predetermined value, the selection signal generating unit 500 generates a selection signal SEL to increase the amplitude of the reference current Iref. When the number of counted clocks signals CLK is less than the predetermined value, selection signal generating unit 500 generates a selection signal SEL to decrease the amplitude of the reference current.

Figure 4:
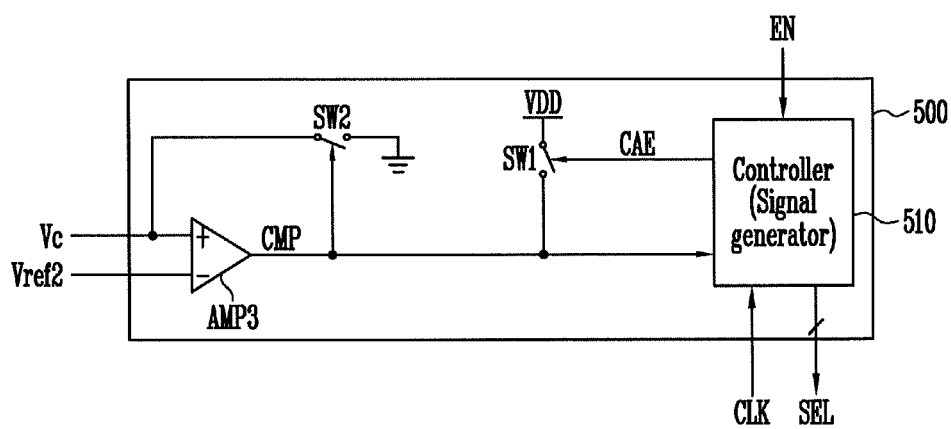
FIG. 4 illustrates an embodiment of a selection signal generating unit.

FIG. 4 illustrates an embodiment of selection signal generating unit 500, which includes a comparator AMP3, a controller 510, and switching elements SW1 and SW2. The comparator AMP3 includes a first input terminal coupled to the one end of the capacitor C, a second input terminal to receive second reference voltage Vref2, and an output terminal to supply a comparison result signal CMP.

The comparator AMP3 compares the voltage Vc charged in capacitor C with the second reference voltage Vref2, and outputs comparison result signal CMP based on the compared result. When voltage Vc is less than second reference voltage Vref2, comparator AMP3 outputs comparison result signal CMP having a low level. When voltage Vc is greater than second reference voltage Vref2, comparator AMP3 outputs the comparison result signal having a high level.

During the period in which voltage Vc is less than second reference voltage Vref2 (e.g., a period in which comparison result signal CMP having a low level is supplied), controller 510 counts clock signals CLK from clock signal generating unit 400, generates selection signal SEL based on the counted result, and supplies the selection signal SEL to reference current generating unit 200. In this way, controller 510 may be considered to be a signal generator.

The controller 510 supplies a current adjustment enable signal CAE to the first switching element SW1 from a time when an enable signal (e.g., supplied from an external source) is supplied to a time when comparison result signal CMP changes from the low level to the high level.

The first switching element SW1 is coupled between power source VDD and the output terminal of comparator CMP3. The first switching element SW1 allows power source VDD and the output terminal of comparator CMP3 to be electrically coupled to each other, based on current adjustment enable signal CAE from controller 510.

The second switching element SW2 is coupled between the first input terminal of comparator AMP3 and ground. The second switching element SW2 allows the first input terminal and ground to be electrically coupled to each other based on the voltage of the output terminal of comparator AMP3. In one embodiment, the controller 510 may include the comparator CMP3 and its attendant switches.

Figure 5:
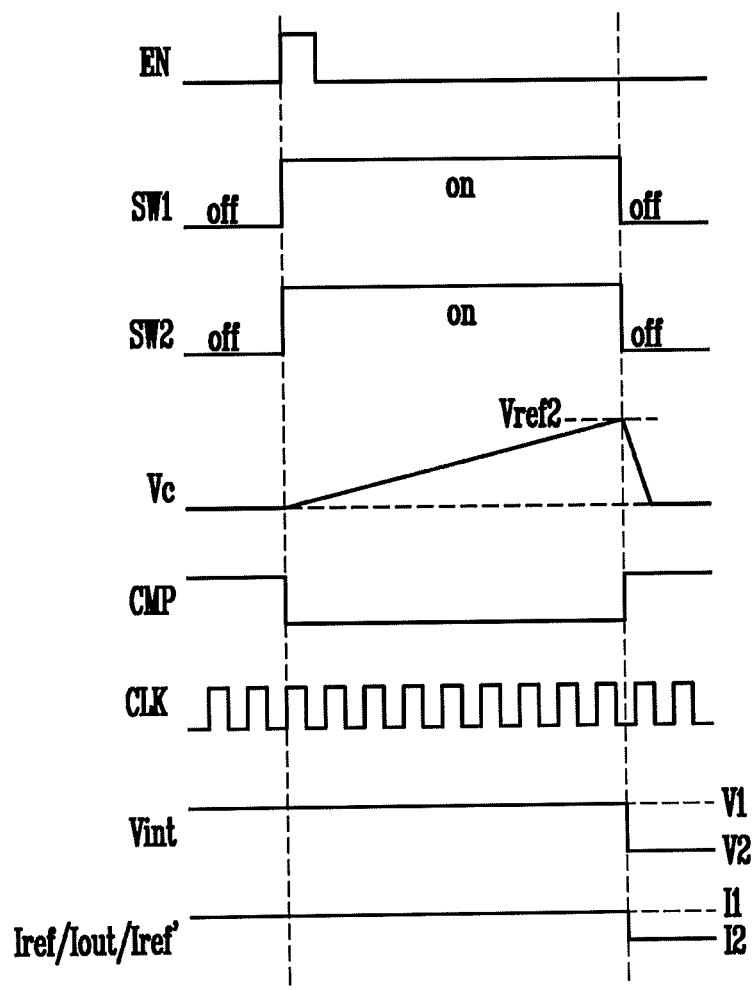
FIG. 5 illustrates examples of control signals and voltages corresponding to the reference current generating unit in FIG. 1.

FIG. 5 illustrates an example of control signals and voltages which may be input to or output from reference current generating unit 200. Referring to FIGS. 1 to 5, before enable signal En is supplied, controller 510 maintains current adjustment enable signal CAE at a high level. Because first switching element SW1 is turned on when current adjustment enable signal CAE has a high level, the output terminal of comparator AMP3 and power source VDD are electrically coupled to each other. The second switching element SW2 allows the first input terminal of comparator AMP3 and ground to be electrically coupled to each other, based on the voltage of the output terminal of comparator AMP3. Thus, voltage Vc of capacitor C is discharged.

When enable signal EN is supplied, controller 510 changes current adjustment enable signal CAE from a high level to a low level. The first switching element SW1 is turned off when current adjustment enable signal CAE has a low level. The comparator AMP3 outputs comparison result signal CMP at a low level during a period in which voltage Vc charged in capacitor C is less than second reference voltage Vref2. The second switching element SW2 is turned off based on the low level of comparison result signal CMP.

Thus, capacitor C charges based on the second current Iref from current mirror unit 300. The voltage Vc charged in capacitor C may increase until second reference voltage Vref2 is recharged. The voltage Vc may charge at a linear rate in capacitor C or at a different rate. The controller 510 counts clock signals CLK from clock signal generating unit 400 based on the low level of comparison result signal CMP.

When voltage Vc charged in capacitor C is greater than second reference voltage Vref2, comparator AMP3 changes comparison result signal CMP from a low level to a high level. The controller 510 supplies a selection signal SEL to reference current generating unit 200. The selection signal SEL may correspond to the clock signals CLK counted during the period in which voltage Vc charged in capacitor C is less than second reference voltage Vref2. The reference current generating unit 200 changes the intermediate voltage Vint from a first voltage V1 to a second voltage V2 based on selection signal SEL. As intermediate voltage Vint changes from the first voltage V1 to the second voltage V2, reference current Iref supplied to current mirror unit 300 and the first and second currents Iout and Iref' from current mirror unit 300 change from a first current I1 to a second current I2.

When comparison result signal CMP changes from a low level to a high level, controller 510 changes the current adjustment enable signal CAE from a low level to a high level. For example, when comparison result signal CMP changes from a low level to a high level, controller 510 finishes a current adjusting process. Accordingly, first switching element SW1 is turned on based on the high level of the current adjustment enable signal CAE. Thus, the output terminal of comparator AMP3 and power source VDD are electrically coupled to each other. Because second switching element SW2 allows the first input terminal of comparator AMP3 and ground to be electrically coupled to each other based on the voltage of the output terminal of comparator AMP3, voltage Vc of capacitor C is discharged.

In accordance with one or more of the aforementioned embodiments, it may be possible to supply a constant reference current in spite of environmental changes.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A current generating circuit, comprising:
    a reference voltage generator to generate a first reference voltage and a second reference voltage;
    a clock signal generator to generate clock signals;
    a reference current generator to generate a reference current corresponding to a selection signal based on the first reference voltage;
    a current mirror to supply a first current and a second current based on the reference current;
    a capacitor to charge based on the second current; and
    a selection signal generator to count the clock signals during a period in which a voltage charged in the capacitor is less than the second reference voltage, and to output the selection signal based on the counted result.

2. The circuit as claimed in claim 1, wherein the first current is supplied as a reference current to another circuit.

3. The circuit as claimed in claim 1, wherein the reference voltage generator includes:
    a reference voltage source to supply the first reference voltage, and
    a second reference voltage generator to generate the second reference voltage based on the first reference voltage.

4. The circuit as claimed in claim 1, wherein the clock signal generator includes a crystal oscillator.

5. The circuit as claimed in claim 1, wherein the reference current generator includes:
    a first intermediate voltage generator to generate a first intermediate voltage based on the selection signal;
    a voltage follower to supply a second intermediate voltage based on the first intermediate voltage; and
    a first resistor coupled between an output terminal of the voltage follower and ground, the first resistor coupled to the reference current.

6. The circuit as claimed in claim 5, wherein the first intermediate voltage generator includes:
    an amplifier to include a first input terminal, a second input terminal, and an output terminal;
    second resistors coupled in series between the output terminal and ground; and
    a selection circuit to allow the second input terminal and one of nodes between respective pairs of the second resistors to be coupled to each other based on the selection signal, wherein the first input terminal receives the first reference voltage and wherein the output terminal supplies the first intermediate voltage.

7. The circuit as claimed in claim 1, wherein the selection signal generator includes:
    a comparator to output a comparison result signal of a first level during a period in which the voltage charged in the capacitor is less than the second reference voltage; and
    a controller to count the clock signals during a period in which the comparison result signal of the first level is supplied, and to output the selection signal based on the counted result.

8. The circuit as claimed in claim 7, wherein the selection signal generator includes:
    a first switching element to allow a power source and an output terminal of the comparator to be electrically coupled to each other based on a current adjustment enable signal; and
    a second switching element coupled between the capacitor and ground, the second switching element to be switched based on a voltage of the output terminal of the comparator.

9. The circuit as claimed in claim 8, wherein the controller supplies the current adjustment enable signal from a time when an enable signal is supplied to a time when the comparison result signal changes from the first level to a second level.

10. A method for driving a current generating circuit, the method comprising:
    generating an intermediate voltage based on a first reference voltage;
    generating a reference current corresponding to the intermediate voltage;
    charging a capacitor based on the reference current;
    counting clock signals during a period in which a second reference voltage is less than a voltage charged in the capacitor; and
    adjusting the intermediate voltage based on the counted result, wherein adjusting the intermediate voltage includes:
    counting the clock signals generated by an oscillator during the period in which the second reference voltage is less than the voltage charged in the capacitor;
    generating a selection signal based on the counted result; and
    adjusting the intermediate voltage based on the selection signal.

11. A current control circuit, comprising:
    a comparator to compare first and second voltages; and
    a signal generator to generate a control signal based on the comparison,
    wherein the first voltage is output from a capacitor and is based on a current, the second voltage is a first reference voltage, and the control signal is to adjust the current to maintain a substantially constant level, wherein the signal generator is to generate the control signal based on clock signals, and wherein the signal generator is to count the clock signals between a first time and a second time, the first time corresponding to when the capacitor stores a second reference voltage and the second time corresponding to when the first voltage substantially equals the second voltage.

12. The circuit as claimed in claim 11, wherein the signal generator is to generate the control signal based on a number of the clock signals counted between the first and second times.

13. The circuit as claimed in claim 12, wherein the number of counted clock signals is based on a period during which the first voltage is less than the second voltage.

14. The circuit as claimed in claim 11, wherein:
the first reference voltage is a predetermined voltage, and
the second reference voltage is substantially a zero voltage.

15. The circuit as claimed in claim 11, wherein the substantially constant level of the current is based on the first reference voltage.

16. The circuit as claimed in claim 11, further comprising:
a current mirror circuit to output the current,
wherein the capacitor is coupled between the comparator and the current mirror circuit.

17. The circuit as claimed in claim 16, wherein the current mirror circuit includes a first signal path coupled to an output terminal and a second signal path to output the current to the capacitor.

* * * * *